(12) United States Patent
Shotton et al.

(10) Patent No.: US 8,543,517 B2
(45) Date of Patent: Sep. 24, 2013

(54) DISTRIBUTED DECISION TREE TRAINING

(75) Inventors: Jamie Shotton, Cambridge (GB);
Mihai-Dan Budiu, Sunnyvale, CA (US);
Andrew William Fitzgibbon,
Cambridge (GB); Mark Finocchio,
Redmond, WA (US); Richard E. Moore,
Redmond, WA (US); Duncan Robertson, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 12/797,430

(22) Filed: Jun. 9, 2010

(65) Prior Publication Data

US 2011/0307423 A1    Dec. 15, 2011

(51) Int. Cl.
*G06F 15/18* (2006.01)
(52) U.S. Cl.
USPC ............................................. 706/12; 707/797
(58) Field of Classification Search
USPC .......................................... 706/12; 707/797
See application file for complete search history.

(56) References Cited

U.S. PATENT DOCUMENTS

| | | | |
|---|---|---|---|
| 5,787,274 A | | 7/1998 | Agrawal et al. |
| 6,055,539 A | | 4/2000 | Singh et al. |
| 6,675,164 B2 * | | 1/2004 | Kamath et al. ........................ 1/1 |
| 7,007,035 B2 | | 2/2006 | Kamath et al. |
| 7,574,411 B2 | | 8/2009 | Suontausta et al. |
| 2003/0176931 A1 * | | 9/2003 | Pednault et al. ................. 700/31 |
| 2003/0229641 A1 * | | 12/2003 | Kamath et al. ................. 707/100 |
| 2006/0122834 A1 * | | 6/2006 | Bennett ........................ 704/256 |
| 2008/0201340 A1 | | 8/2008 | Thonangi |
| 2009/0197616 A1 * | | 8/2009 | Lewis et al. ................ 455/456.1 |
| 2009/0252435 A1 * | | 10/2009 | Wen et al. ...................... 382/284 |
| 2011/0188715 A1 * | | 8/2011 | Shotton et al. ................ 382/128 |

OTHER PUBLICATIONS

Chen, et al., "BreadthFirst with DepthFirst BDD Construction: A Hybrid Approach", Retrieved at << http://citeseerx.ist.psu.edu/viewdoc/download?doi=10.1.1.45.4709&rep=rep1&type=pdf >>, Technical Report, CMU-CS-97-120, Mar. 1997, pp. 18.

Coates, et al., "Scalable Learning for Object Detection with GPU Hardware", Retrieved at << http://www.stanford.edu/~acoates/papers/coates_iros2009.ps >>, Proceedings of the 2009 IEEE/RSJ international conference on Intelligent robots and systems, Oct. 10-15, 2009, pp. 7.

(Continued)

*Primary Examiner* — Kakali Chaki
*Assistant Examiner* — Mai T Tran
(74) *Attorney, Agent, or Firm* — Alleman Hall McCoy Russell & Tuttle LLP

(57) ABSTRACT

A computerized decision tree training system may include a distributed control processing unit configured to receive input of training data for training a decision tree. The system may further include a plurality of data batch processing units, each data batch processing unit being configured to evaluate each of a plurality of split functions of a decision tree for respective data batch of the training data, to thereby compute a partial histogram for each split function, for each datum in the data batch. The system may further include a plurality of node batch processing units configured to aggregate the associated partial histograms for each split function to form an aggregated histogram for each split function for each of a subset of frontier tree nodes and to determine a selected split function for each frontier tree node by computing the split function that produces highest information gain for the frontier tree node.

20 Claims, 8 Drawing Sheets

(56) References Cited

OTHER PUBLICATIONS

Ben-Haim, et al., "A Streaming Parallel Decision Tree Algorithm", Retrieved at << http://jmlr.csail.mit.edu/papers/volume11/ben-haim10a/ben-haim10a.pdf >>, Journal of Machine Learning Research, Feb. 2010, pp. 849-872.

Yu, et al., "DryadLINQ: A System for General-Purpose Distributed Data-Parallel Computing Using a High-Level Language", Retrieved at << http://research.microsoft.com/en-us/projects/dryadlinq/dryadlinq.pdf >>, In Proceedings of the 8th Symposium on Operating Systems Design and Implementation (OSDI), Dec. 8-10, 2008, pp. 1-14.

Yang, et al., "Parallel Breadth-First BDD Construction", Retrieved at << http://citeseerx.ist.psu.edu/viewdoc/download?doi=10.1.1.27.4938&rep=rep1&type=pdf >>, ACM SIGPLAN Notices, vol. 32, No. 7, Jul. 1997, pp. 12.

"Distributed Decision Tree Induction", Retrieved at << http://www.slideshare.net/gregoryg/distributed-decision-tree-induction >>, Retrieved Date: Apr. 9, 2010, pp. 2.

Ben-Haim, et al., "A Streaming Parallel Decision Tree Algorithm", Retrieved at << http://largescale.first.fraunhofer.de/media/abstracts/73_Ben-Haim_Parallel_Decision_Tree.pdf >>, In Large Scale Learning Challenge Workshop at the International Conference on Machine Learning (ICML), 2008, pp. 4.

Srivastava, et al., "Parallel Formulations of Decision Tree Classification Algorithms", Retrieved at << http://citeseerx.ist.psu.edu/viewdoc/summary?doi=10.1.1.41.7475 >>, ICPP, Proceedings of the 1998 International Conference on Parallel Processing, Aug. 10-14, 1998, pp. 1-24.

Steinhaeuser, et al., "Exploiting Thread-Level Parallelism to Build Decision Trees", Retrieved at << http://www.nd.edu/~nchawla/Papers/ECML06.pdt >>, 2008, pp. 12.

* cited by examiner

DISTRIBUTED DECISION TREE TRAINING

BACKGROUND

Machine learning techniques can be employed to enable computers to process empirical data and draw conclusions thereon. One example machine learning technique is the training of a decision tree based on example data, and applying the trained decision tree to classify unknown data into one of several classes. In many applications, more accurate results may be obtained by using as large a data set as possible for the training of the decision tree. However, one drawback of training decision trees with large data sets is that such training can overwhelm the processor or memory resources of a computing system, thereby making the training of the decision tree impractical or impossible. As a result, computer scientists and software developers are limited in the size and complexity of the data sets that they can use for training decision trees, and improvements in the classification ability of such decision trees are difficult to come by.

SUMMARY

A computerized decision tree training system and method are provided. The computerized decision tree training system may include a distributed control processing unit configured to receive input of training data for training a decision tree. The system may further include a plurality of data batch processing units, each data batch processing unit being configured to evaluate each of a plurality of split functions of a decision tree for respective data batch of the training data, to thereby compute a partial histogram for each split function, for each datum in the data batch. The system may further include a plurality of node batch processing units configured to aggregate the associated partial histograms for each split function to form an aggregated histogram for each split function for each of a subset of frontier tree nodes and to determine a selected split function for each frontier tree node by computing the split function that produces highest information gain for the frontier tree node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
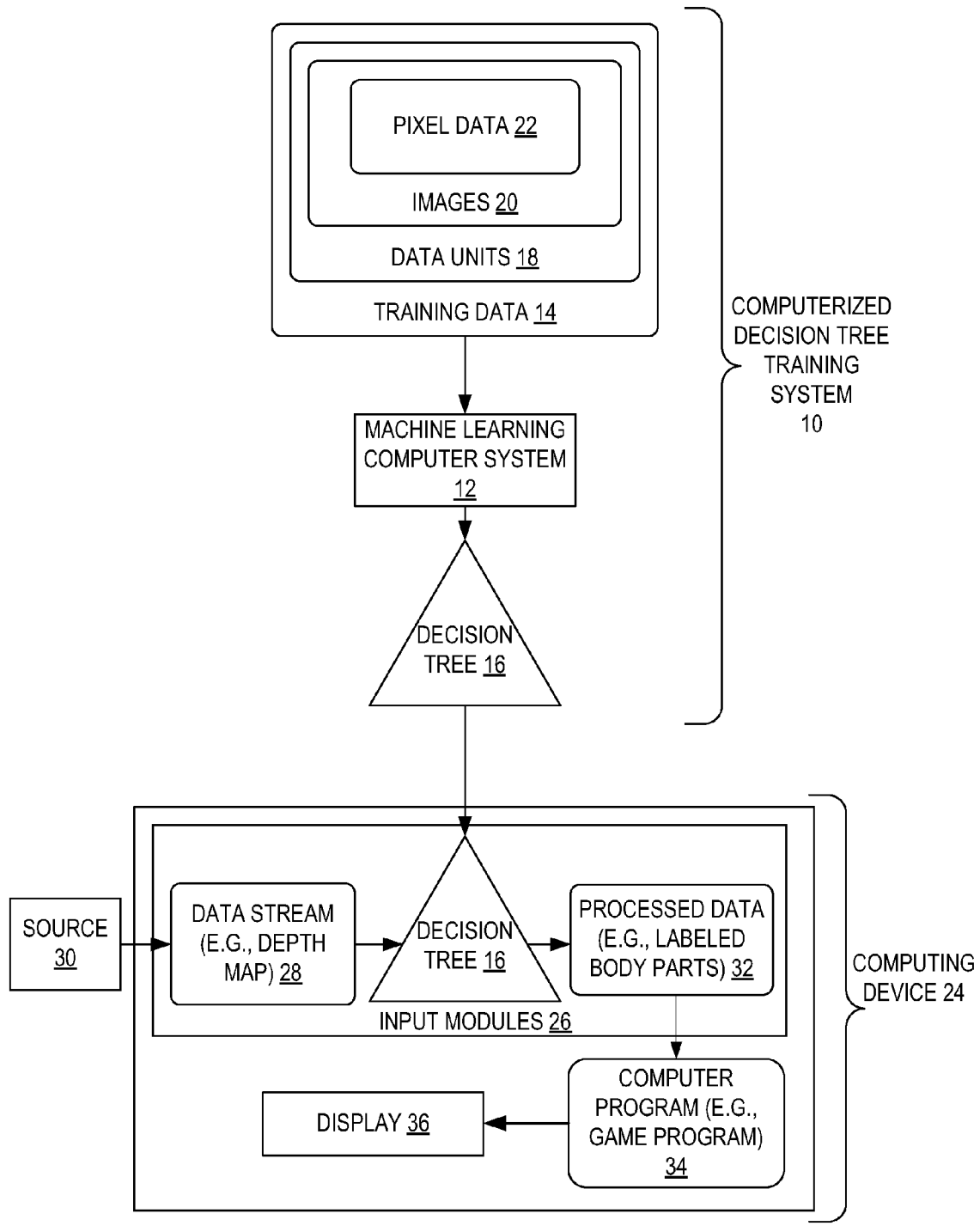
FIG. 1 is a schematic diagram of a computerized decision tree training system, according to one embodiment of the present invention.

FIG. 1 shows a computerized decision tree training system 10. The computerized decision tree training system 10 is comprised of a machine learning computer system 12 configured to receive training data 14, process the training data 14, and output a trained decision tree 16. Training data 14 includes a number of examples, which have been classified into one of a predetermined number of classes. The decision tree 16 may be trained based on the training data 14, according to processes described below.

The training data 14 may include a variety of data types, and is typically organized into multiple data units 18. In one particular example, the data units 18 may contain images 20 or image regions, which are in turn comprised of pixel data 22. Alternatively or in addition, the data units 18 may be comprised of audio data, video sequences, 3D medical scans, or other data.

Following training of the decision tree 16 by the computerized decision tree training system 10, the decision tree 16 may be installed in an input module 26 on a downstream computing device 24 for use in processing and classifying data in a data stream 28 received by the input module 26 from a data source 30 associated with the computing device 24. In one example, the data source 30 is a depth camera, the computing device 24 is a gaming console, and the data stream 28 contains a series of images including depth information, received in real time from the depth camera. In another example, the data source 30 may be a microphone, and the data stream may contain a stream of audio signals. In yet another example, the data source 30 may be a medical imaging device, the computing device 24 may be a medical analysis computer, and the data stream 28 may contain a series of images received from the medical imaging device.

The input module 26 is configured to classify the data units in the data stream 28 using the decision tree 16, to thereby produce processed data 32. In one example, the processed data 32 may include image data in which each pixel in each image has been assigned a class, such as a body part on a body model, by the decision tree, as discussed in detail below. The processed data 32 may be passed to a computer program 34, such as a game program, for downstream handling. The computer program 34 in turn is configured to interpret the processed data 32 and display associated graphical output on a display 36 associated with the computing device 24. In the example above, the computer program may be a game program, and the processed data may images of a player, encoded on a pixel by pixel basis with body part classifications, by the decision tree. A player may naturally move his body in front of the depth camera, to thereby create natural input that is classified by the decision tree 16, and interpreted by the computer program 34 to control a player—character in a game, for example.

Figure 2:
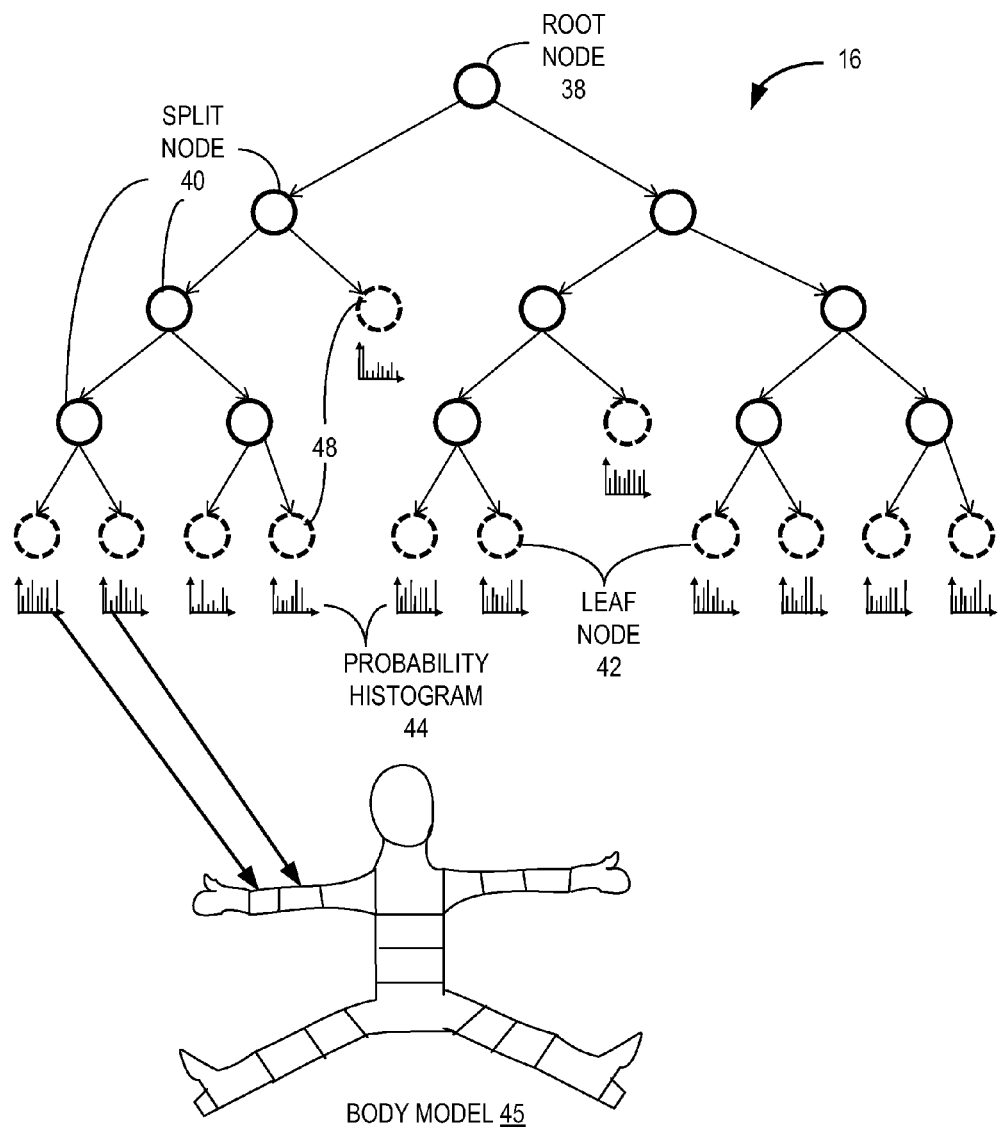
FIG. 2 is a schematic diagram illustrating a decision tree that may be computed by the system of FIG. 1.

Referring now to FIG. 2, this figure illustrates generally an example of the decision tree 16 of the system of FIG. 1. Decision tree 16 includes one root node 38, which contains or has access to all the processed training data 14 from the machine learning computer system 12 of computerized decision tree training system 10, during training by machine learning computer system 12. During training, the decision tree 16 is branched from the root node 38 through several levels of split nodes 40 according to a training algorithm (such as depth first, breadth first, or hybrid breadth/depth discussed below), and ultimately terminates in leaf nodes. At any given iteration of the training algorithm, the decision tree 16 may be computed up until a set of frontier tree nodes 48, illustrated by dashed lines.

The decision tree 16 has a number of associated split functions, which can be evaluated to evince differences in the training data 14. To build the decision tree 16, at each frontier node 48, a split function must be chosen to create a split node from the frontier node. A plurality of candidate split functions are evaluated, and the split function that produces maximum information gain (entropy) is assigned to the split node. In this manner the tree branches until a predetermined minimum threshold of information gain is achieved, or a predetermined number of levels in the decision tree is reached, or some other termination condition is satisfied. The branches of the decision tree terminate in leaf nodes 42, or terminal nodes, each of which has a class and a probabilistic histogram 44 associated with it. The histogram represents the probability that the training data that traverses the tree to that leaf node is a member of each class. In one example, the classes may represent body locations on a body model 45, for using in processing body images taken by a depth camera, as described above.

Figure 3:
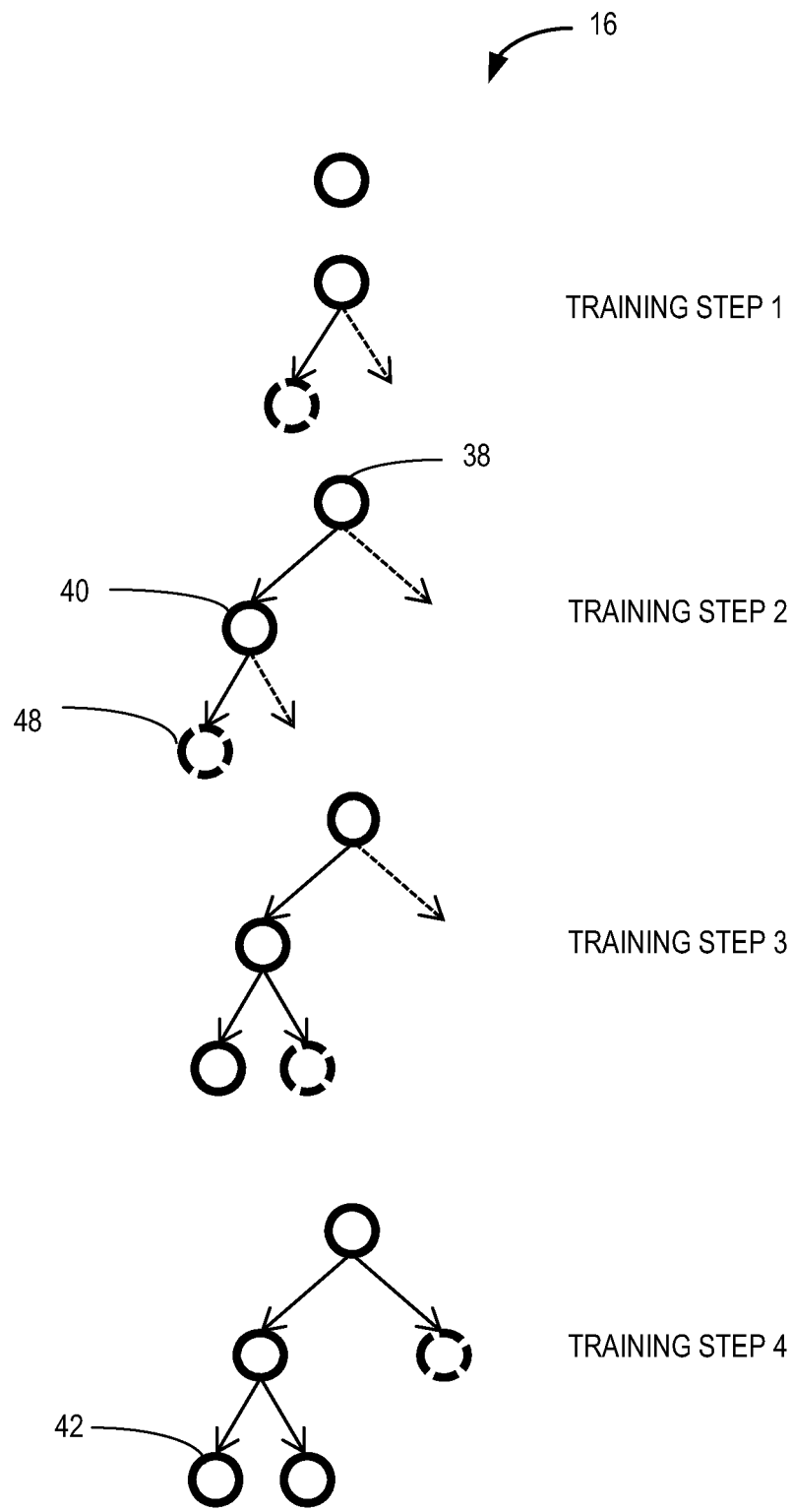
FIG. 3 is a schematic diagram illustrating depth first training of a decision tree, which may be implemented by the system of FIG. 1.

Referring now to FIG. 3, this figure illustrates a depth first training algorithm for the decision tree 16, which may be implemented by the system of FIG. 1. The depth first training algorithm is a recursive decision tree traversal algorithm which begins at the root node 38 and traverses the decision tree 16 going one level deeper in each step based on maximum gain in information, until a leaf node 42 is arrived, before backtracking. In one particular example, a simplest depth first training algorithm starts with all the multiple data units 18, including all training examples, such as the pixel data 22 of an image 20, and proceeds from the root node 38 by selecting a set of split functions. For each split function, two probabilistic histograms 44 are built over classes of multiple data units 18, one for the left and one for the right outcomes at a node of the decision tree 16. A split function for each split node may be chosen based on split evaluation criteria. In one embodiment, the split evaluation criteria involves locally selecting a split function that gives the maximum expected gain in information, which may be expressed according to the following formula.

$$E(Q) - \sum_{s \in \{l,r\}} \frac{|Q_s|}{|Q|} E(Q_s)$$

In the above equation, E(Q) is the Shannon entropy of distribution Q, and Q_l and Q_r are the histograms for the left and right branches from the node.

It will be appreciated that other split evaluation criteria may be used such as Gini coefficient entropy, so-called "two-ing" criteria, tree balance criteria for equally splitting the tree, etc.

Once the split function is locally selected for a given split node using one of these split evaluation criteria, the corresponding split node containing a set of data units 18 is partitioned into left and right subsets of data units 18. This process is then recursively applied on the left and right subsets of data units 18, partitioned until a predetermined maximum depth is reached based on a termination condition which may be a minimum threshold gain in information, a minimum number of examples at the node, predetermined number of levels, or other termination condition. For computational efficiency, for example, a depth first algorithm may be utilized that computes the decision tree to a predetermined number of ten levels, or more or fewer levels, as desired. As another example, a minimum number of example datum at the split node can be established as a termination condition, which can help prevent overfitting of the decision tree with the adverse result of working well on the training data 14, but not well on the data stream 28.

The depth first training algorithm typically involves random access to different areas of memory (such as different pixels in different images), and so typically stores all data units 18 in memory, which may require significant memory for large sets of training data. Further, the depth first training algorithm may need a potentially exponential, in terms of tree depth, number of hard disk reads to train the decision tree 16, thereby consuming significant access time. However, once all data units 18 are stored in memory, the memory requirements do not grow significantly during training of the decision tree 16.

Figure 4:
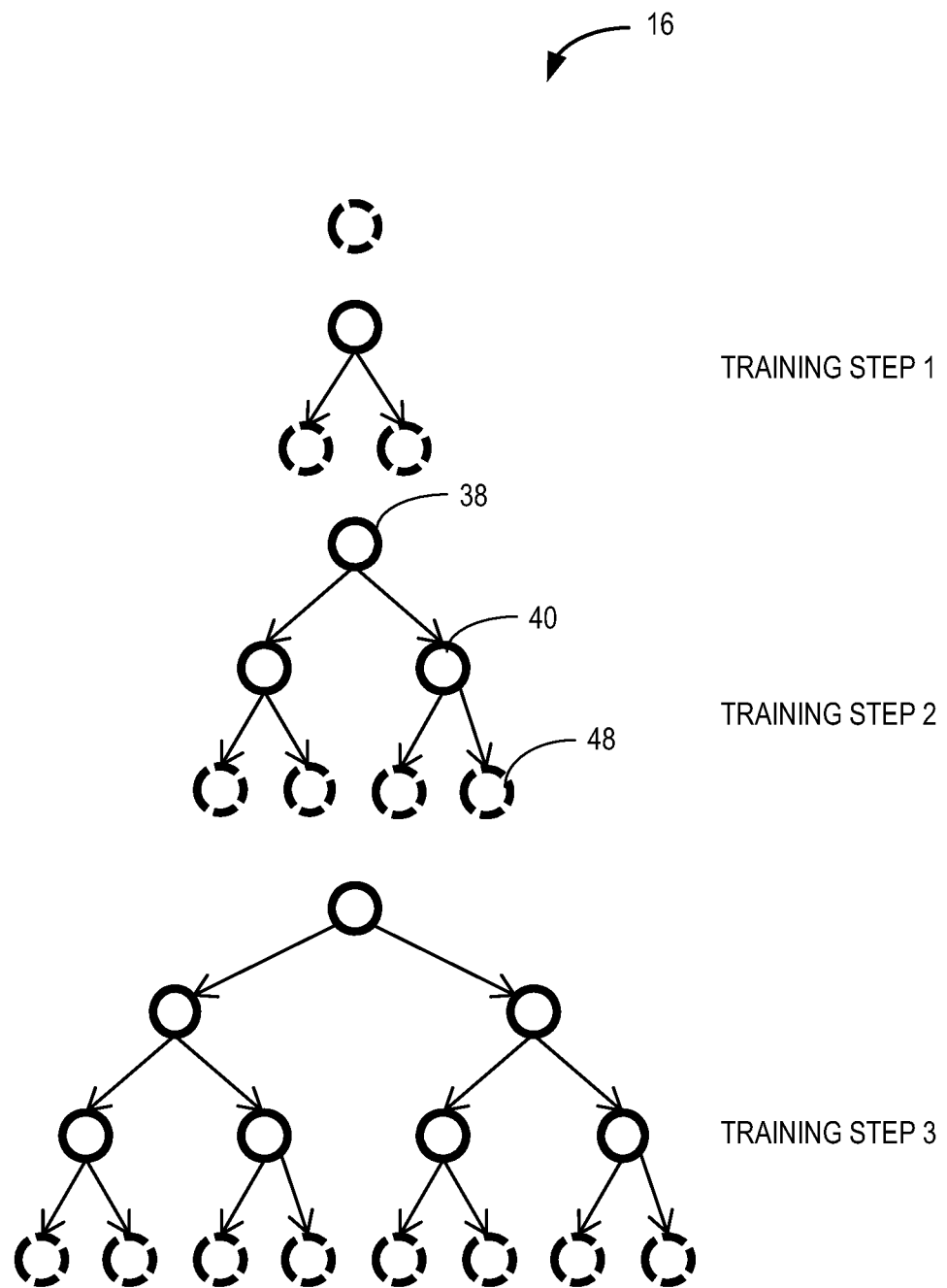
FIG. 4 is a schematic diagram illustrating breadth first training of a decision tree, which may be implemented by the system of FIG. 1.

Referring now to FIG. 4, this figure illustrates a breadth first training algorithm of the decision tree 16, which may be implemented by the system of FIG. 1. The breadth first training algorithm is a tree traversal algorithm that begins at the root node 38 and explores all the neighboring split nodes. In the breadth first training algorithm, a frontier of frontier tree nodes 48 (dashed) is maintained and one iteration or round of training iterations expands all frontier nodes in the frontier. The frontier starts at the root node 38 and is expanded as each frontier node is reclassified as a split node 40, and branches to two new frontier nodes in the next iteration. Assuming all nodes in the frontier are expanded by the algorithm this will double the size of the frontier at each time step.

As described above, training the decision tree 16 by the depth first or breadth first algorithms with large data sets can improve performance of the decision tree 16, but can also be time and resource intensive. For example, in one implementation, the training data may include billions of images, each of which may include hundreds of thousands of pixels. In this implementation, over a hundred thousand split functions may be used to build a decision tree which classifies each pixel of each image into one of approximately 30 classes, such as body parts of body model 45 described above. Thus, for each split node in the decision tree, each pixel is evaluated for each split function, and the total computations required to compute the decision tree become quite large.

Expressed formulaically, in order to process this large of a data set using the breadth first algorithm, a histogram of the size N×F×C×B is built up in memory of a computer during training of the decision tree, where N is the number of frontier nodes, F is the number of split functions (e.g., >100,000), C is the number of classes (e.g., 30), and B is the tree arity (e.g., 2 for a binary tree). For the depth first algorithm, only one node is processed at a time, and thus N=1. As a result, a three dimensional histogram of the size F×C×B is built up in memory during training with the depth first algorithm. While the depth first algorithm consumes less memory than the breadth first algorithm, if the data does not fit in RAM then the number of disk accesses increases exponentially with the depth of the decision tree, thereby slowing down computation. Indeed, for very large data sets, computation may be a practical impossibility using either the breadth first or depth first algorithm, since either of these algorithms would take far more time to compute than is commercially reasonable, or necessitate more processor speed or memory than is available on a typical single processor computer.

To address the shortcomings of using either the breadth first algorithm or the depth first algorithm on a typical single processor computer, machine learning computer system 12 may employ a distributed processing algorithm that efficiently utilizes hardware resources of multiple networked computing devices to train the decision tree 16 on large sets of training data 14. Such a system is shown in FIG. 5, which illustrates internal details of the machine learning computer system 12 of the computerized decision tree training system 10 of FIG. 1.

Figure 5:
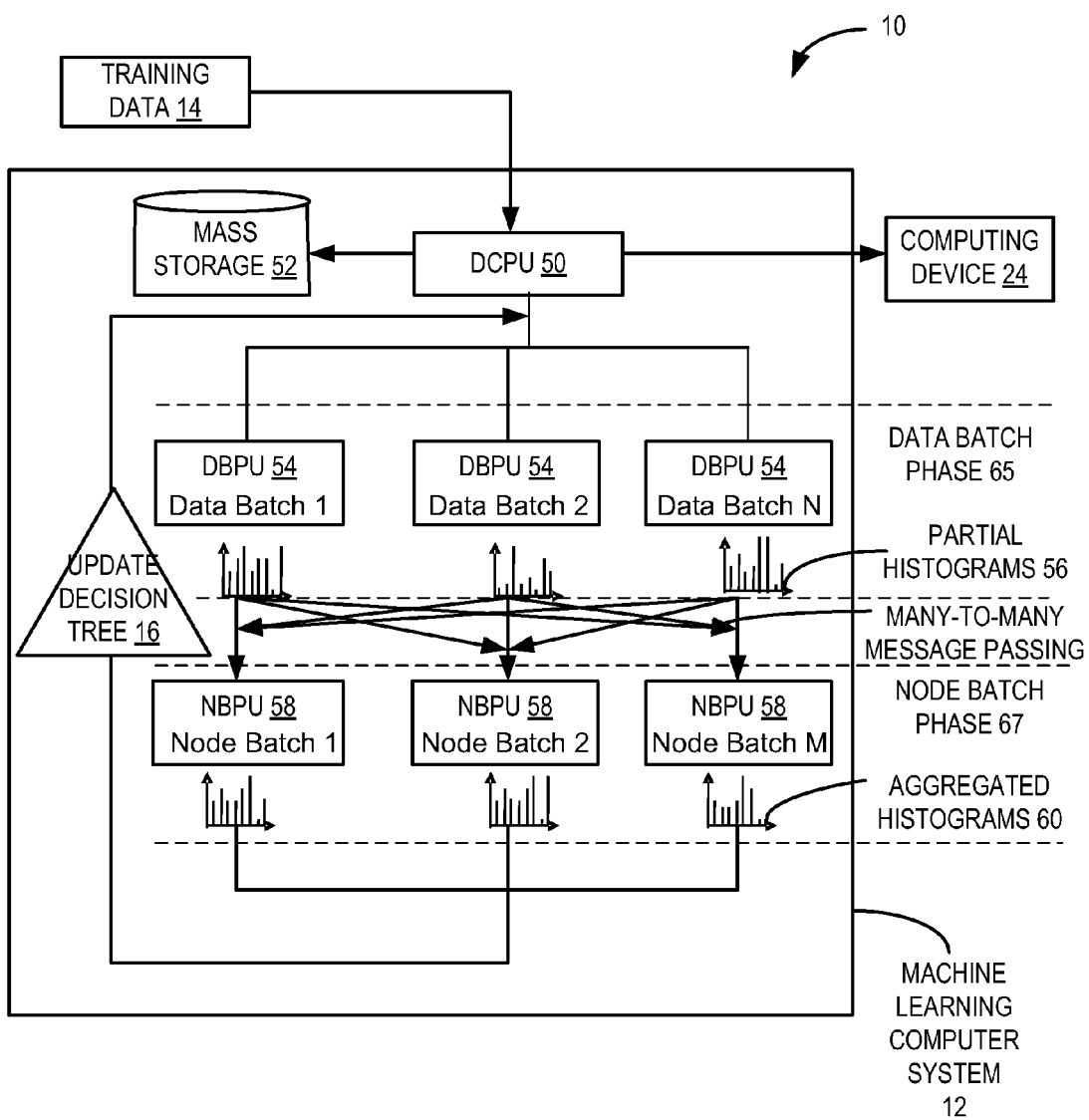
FIG. 5 is a detailed schematic diagram of the machine learning computer system of the computerized decision tree training system of FIG. 1, configured to train a decision tree by processing data batches and node batches on respective processing units.

As shown in FIG. 5, the machine learning computer system 12 includes a distributed control processing unit (DCPU) 50 having a processor and associated memory. The distributed control processing unit 50 contains program logic that, in a series of successive iterations, divides the training data into data batches, distributes the data batches among various processing units for parallel processing, and builds the decision tree based on the results of the parallel processing.

During each iteration, the training data goes through a data batch phase 65 and a tree node batch phase 67. Computations for the data batch phase 65 are performed by data batch processing units (DBPU) 54 and computations for tree node batch phase 67 are performed by node batch processing units (NBPU) 58. It will be appreciated that the data batch processing units 54 and node batch processing units 58 may be separate computing devices or separate cores on a multi-core computing device, or a combination thereof, and in some embodiments a computing device and/or core may serve both as a data batch processing unit 54 during the data batch phase 65 and as a node batch processing unit 58 during the node batch processing phase 67.

Returning to FIG. 5, the distributed control processing unit 50 is configured to receive and store the training data 14 in an associated mass storage device 52. The distributed control processing unit 50 is configured to partition the received training data 14 into a plurality of data batches, and to send those data batches to respective data batch processing units 54 for distributed processing in each of a series of successive iterations. Each data batch includes a subset of the data units 18 of the training data 14. In one example, a first data batch may include images 1-100000, and a second data batch may include images 100001-200000 of a total number of images in the training data 14, etc.

As illustrated, the machine learning computer system 12 includes a plurality of the data batch processing units 54. Each data batch processing unit 54 is configured to receive a respective data batch representing a subset of the data units 18 in the training data 14 from the distributed control processing unit 50. Thus, in the above example, a first data batch processing unit 54 may receive images 1-100000, a second data batch processing unit 54 may receive images 100001-200000, and so on. By batching the training data 14 in this manner, a data batch of a manageable size may be sent to each data batch processing unit 54 for processing in the data batch phase.

During the data batch phase, each of the plurality of data batch processing units 54 is further configured to evaluate each of a plurality of split functions of the decision tree for the respective data batch 64, to thereby compute a partial histogram 56 for each split function and each datum in the data batch. Thus, the same split functions are evaluated by each data batch processing unit 54, on different data batches 64. For example, one split function might compute whether a pixel depth of a current pixel is a threshold distance less than a pixel depth of a pixel that is 10 pixels above the current pixel (Is CurrentPixel (PixelDepth)<Pixel_10PixelsAbove(PixelDepth), and another split function might compute whether an intensity of the current pixel is above an intensity threshold (Is CurrentPixel(Intensity)>IntensityThreshold). It will be appreciated that in a decision tree with arity 2, each split function has a first outcome and a second outcome. Thus, the partial histograms 56 represent the probability that each datum (e.g., pixel) of each data unit (e.g., image) in each data batch would be classified by each split function (of the, e.g., 100,000 split functions) to reach the first outcome or the second outcome. At this stage in processing, the partial histogram 56 does not include data for all data in all the data units, nor is the training data yet organized by node in the decision tree 16.

To implement the node batch phase 67, the machine learning computer system 12 further includes a plurality of the node batch processing units 58 which are assigned respective subsets of the frontier tree nodes 48 by the distributed control processing unit 50. As explained above, the frontier tree nodes 48 of decision tree 16 are those nodes for which split functions are being evaluated in a current training iteration of the decision tree, as illustrated by dashed circles in FIGS. 2-4. By dividing the frontier tree nodes 48 into subsets, a manageable amount of data is sent to each of the node batch processing units for processing. Each subset of training data 14 includes each datum that is classified by the decision tree to be at a corresponding frontier tree node 48 during the current iteration.

During the node batch phase 67, for each of a subset of frontier tree nodes 48 of the decision tree 16 in a respective tree node batch 66, each node batch processing unit 58 is configured to aggregate the associated partial histograms 56 for each split function to form an aggregated histogram 60 for each split function at each of the frontier tree nodes of the subset.

In each iteration, to distribute the data computed by the data batch processing units 54 in the data batch phase 64 to the appropriate node batch processing units 58 for the node batch phase 67, many-to-many message passing between the respective processing units may be utilized, according to the following control scheme. First, the distributed control processing unit 50 is configured to assign each of the plurality of node batch processing units 54 a respective subset of the frontier tree nodes. Each of the plurality of data batch processing units 54 is configured to select a subset of data from the respective data batch 64, the selected subset of data including each datum that is classified by the decision tree 16 to be at a corresponding frontier tree node. Further each of the plurality of data batch processing units 54 is configured to transmit the partial histogram 56 for the selected subset of data to the node batch processing unit 58 associated the corresponding frontier tree node, for the node batch processing units 58 to aggregate the associated partial histograms 56 for each split function to form an aggregated histogram 60.

In one embodiment, each of the node batch processing units 58 is configured to determine a selected split function for each frontier tree node 48 in the respective subset by computing the split function that produces highest information gain or maximum entropy for the frontier tree node 48. Alternatively, other split evaluation criteria may be employed to select the split function for each split node, as discussed above.

The distributed control processing unit 50 is further configured to reclassify each of the frontier tree nodes 48 as a split node 40 including a respective one of the selected split functions (e.g., with highest information gain), to expand the decision tree 16 to include new frontier tree nodes 48 branching from the split nodes, and to output the decision tree 16 for installation on a downstream computing device 24 for use as described above.

It will be appreciated that a new set of frontier nodes is trained with each loop of the distributed processing algorithm through the data batch phase 65, the node batch phase 67, and the updating of the decision tree. The distributed control processing unit 54 is configured to reclassify each of the frontier tree nodes 48 of the current version of the decision tree that does not meet the termination condition described above as a split node including a respective one of the selected split functions which has been determined to provide the maximum information gain at each frontier node, in order to expand the decision tree to include new frontier tree nodes branching from the split nodes. In this manner, the decision tree may be grown in a series of training steps, as illustrated in FIGS. 3 and 4. The distributed control processing unit 54 may be configured to iteratively compute the decision tree until the decision tree has been calculated to a desired level, such as a predetermined depth or until a predetermined threshold information gain is achieved at each frontier node. Once the decision tree is computed to the desired level, the distributed control processing unit 50 is configured to output the decision tree for installation on the downstream computing device 24, as described previously.

As described above, in some embodiments, each data unit 18 contains at least one image 20, and each image 20 includes at least one datum, which is a pixel. The computation of a split function for such a data unit may include computation of a pixel characteristic for the pixel, where each pixel has pixel data 22 including color, intensity, and depth. The depth may be determined by a depth camera of a game console, or other device. The pixel characteristic may be computed based on the pixel data for a target pixel, and also based on pixel data for other pixels in a vicinity of the target pixel, as described above.

As shown in FIG. 2 the training data 14 may include images of bodies, and at least some of the pixels in the training data 14 may have been classified as being associated with respective classes in a body model 45, the classes representing corresponding body locations on the body model 45. This may be useful as natural input for use in games, or for medical imaging, etc. The output decision tree 16 may be configured to classify the pixels of a target image into one of a plurality of classes and each class is associated with one of the leaf nodes or frontier tree nodes. In this manner the output decision tree 16 may classify pixels in an image as being associated with body locations on a user, such as game player of a game console, for use as natural input to a game program, for example.

Figure 6:
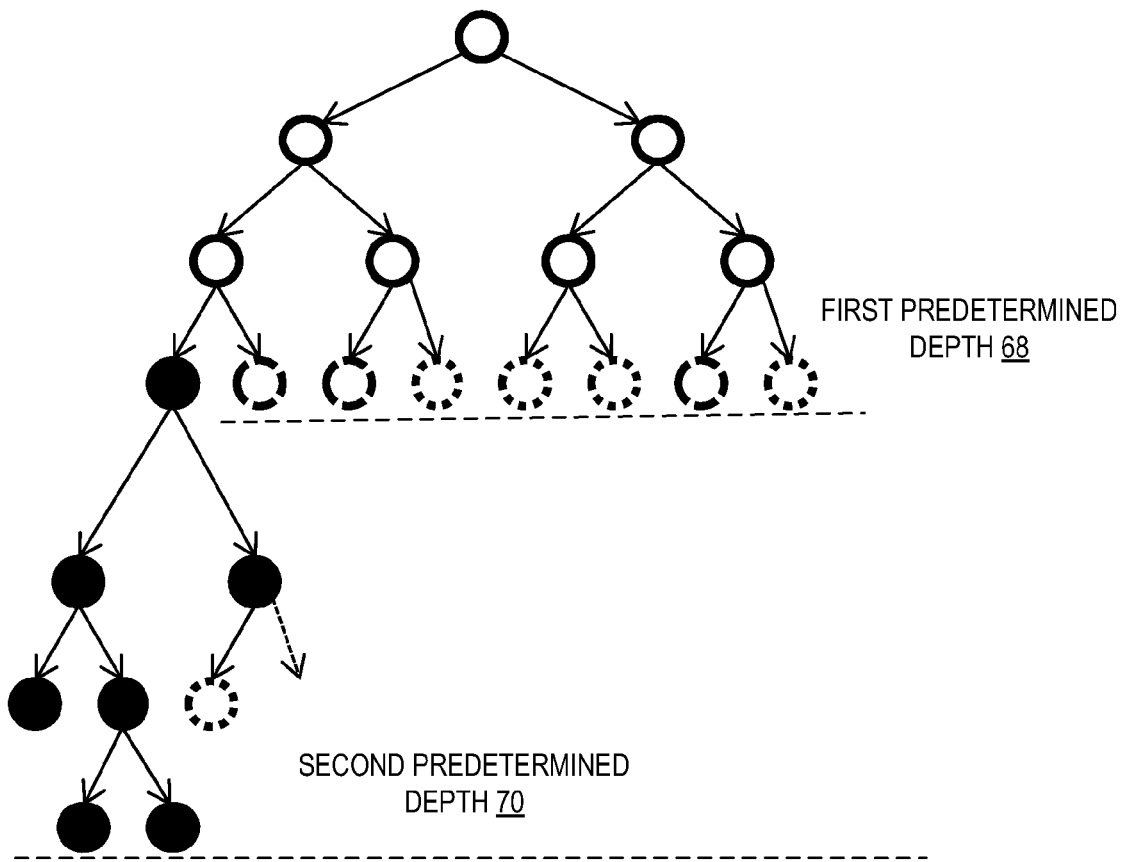
FIG. 6 is a schematic diagram illustrating a hybrid breadth first/depth first training algorithm, which may be implemented by the system of FIG. 1.

Referring now to FIG. 6, this figure illustrates a hybrid breadth first/depth first training algorithm, which may be implemented by the machine learning computer system 12. The hybrid breadth first/depth first algorithm includes at least one breadth first training phase and at least one depth first training phase. These phases may be ordered in a suitable order, and repeated when desired, to achieve processing efficiency. For example, breadth first training may be engaged until the system determines that all of the data units required to train one or more frontier nodes will fit in memory of an individual processing unit, at which point depth first training may begin. According to the illustrated example of training according to the hybrid depth first/breadth first algorithm in FIG. 6, the decision tree is expanded in a first phase according to a breadth first training algorithm to a first predetermined depth 68, and is expanded in a second phase according to a depth first training algorithm, until a second predetermined depth 70. Each of the first predetermined depth 68 and second predetermined depth may be a respective user specified depth, or may be a depth at which a respective minimum threshold information gain is achieved, for example. In one example both the first and second predetermined depths may be heuristically selected by examining performance data of the machine learning computer system 12, for example, to select a appropriate depths. It will be appreciated that the breadth first/depth first phases may be iteratively implemented, as desired, to train the decision tree.

Figure 7:
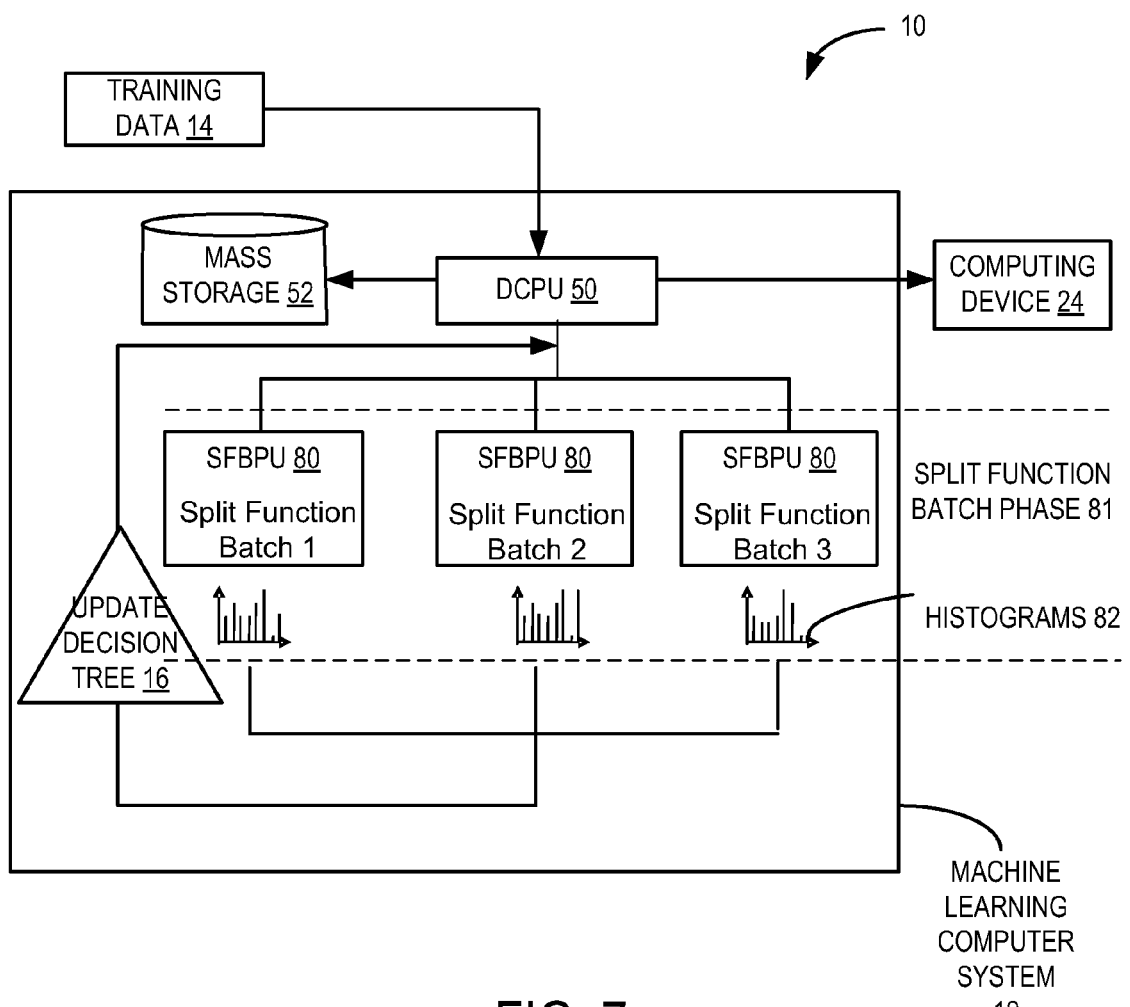
FIG. 7 is a detailed schematic diagram of another embodiment of the machine learning computer system of the computerized decision tree training system of FIG. 1, configured to train a decision tree by processing split function batches on respective processing units.

Referring now to FIG. 7, this figure illustrates another embodiment of a distributed computing algorithm that may be implemented by the machine learning computer system 12 for decision tree training by processing split function batches on respective split function batch processing units 80, during a split function batch phase 81. The split function batch phase 81 typically occurs during each iterative training loop of a breadth first training algorithm implemented by distributed control processing unit 50. During the split function batch phase 81, the distributed control processing unit 50 is configured to distribute all data units in the training data 14 to each of the split function batch processing units 80, and to the partition the split functions into a plurality of subsets, and distribute each subset of the split functions to a respective split function batch processing unit 80. For each subset, the split functions are evaluated and histograms 82 computed for each, and an optimal split function is chosen for the subset, based on the maximum information gain principles described above. Then, the optimal split functions for each subset are gathered by the distributed control processing unit 50, which aggregates the subset data and selects an optimal split function for each frontier node of the current decision tree. Typically, the decision tree is updated and expanded based on the chosen split functions at each iteration until a desired depth is reached.

According to another embodiment, a hybrid split function/breadth first distributed training algorithm may be employed, which includes a breadth first phase and a split function phase. According to this hybrid algorithm, to further reduce the memory utilized by breadth-first training alone, in the breadth first phase the breadth-first training algorithm can be run in a serial, parallel, or distributed manner, for subsets of the split functions on one or more processing units. Then, in the split function phase, the results of the breadth first phase may be aggregated by computing the split functions that best meet the split evaluation criteria described above (maximum information gain, etc.), across all subsets. Such an approach provides improved opportunities for efficient scheduling of tasks, since there are more computation vertices in the resulting computation graph.

Figure 8:
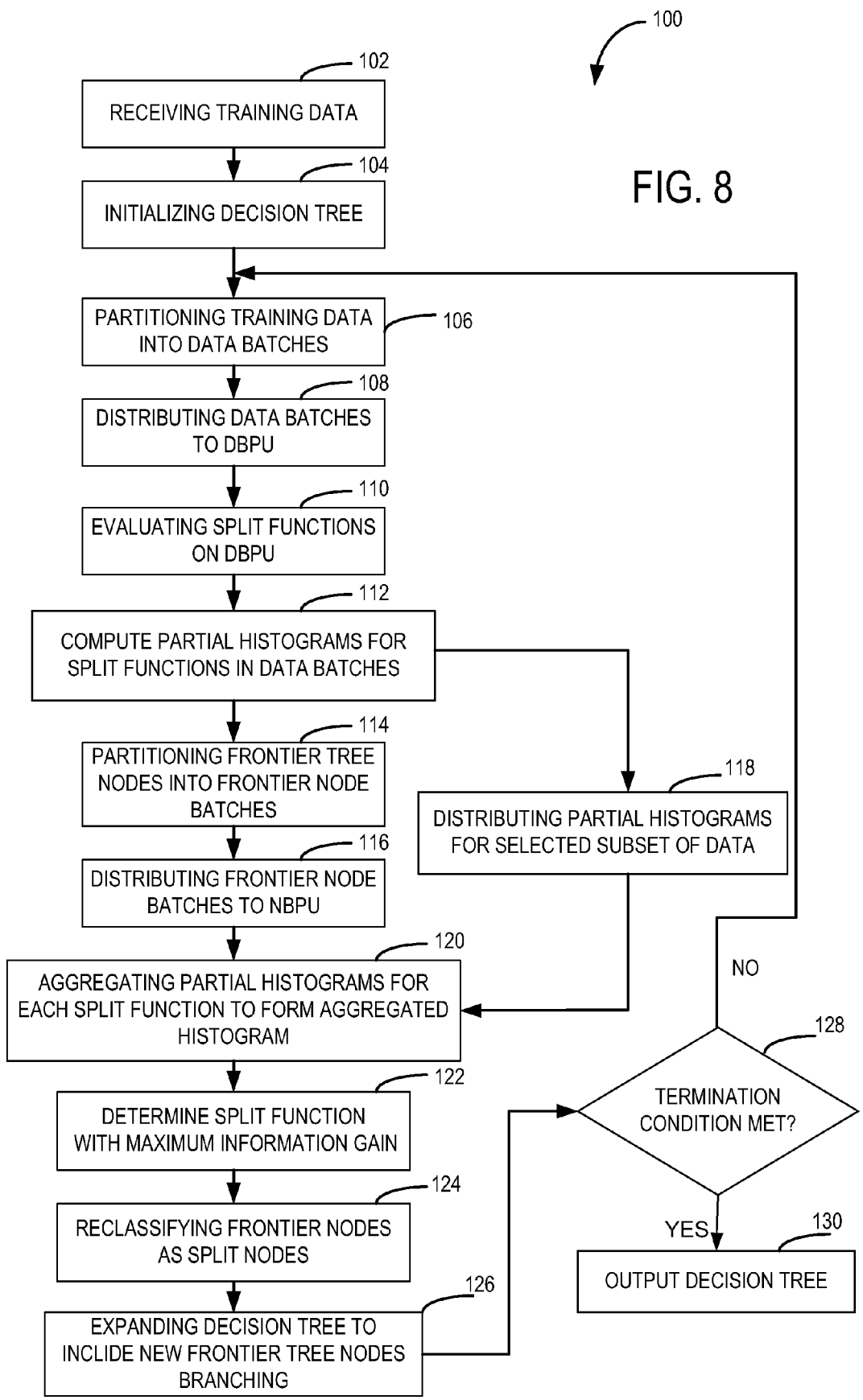
FIG. 8 is a flowchart of one embodiment of a computerized decision tree training method.

Turning now to FIG. 8, this figure illustrates one embodiment of a computerized decision tree training method 100. It will be appreciated that method 100 may be implemented by the hardware and software components of the system 10 described above, or by other suitable hardware and software components. At 102, the method includes receiving input of training data. The training data may include multiple data units, each data unit including at least one image or image region, each data unit further including at least one example datum having an associated class label. At 104, the method may include initializing a decision tree, the decision tree being having a plurality of associated split functions and classes, and being comprised of a root node and one or more split nodes and frontier tree nodes.

At 106, the method may include partitioning the training data into a plurality of data batches, each data batch including a respective subset of data units. At 108, the method may include distributing each data batch to a respective data batch processing unit. At 110, the method may include for each datum in each data unit in each data batch, evaluating each of the split functions on the respective data batch processing unit for the data batch, to thereby, at 112, compute a partial histogram for each split function and each datum in the data batch.

At 114, the method may include partitioning the frontier tree nodes into a plurality of frontier tree node batches. At 116, the method may include distributing each frontier tree node batch to a respective node batch processing unit. At 118, the method may include distributing the partial histograms for a selected subset of data from each data unit in each data batch on each of the respective data batch processing units to a corresponding node batch processing unit. The selected subset is selected by selecting each datum that is classified by the decision tree to be at a frontier tree node that corresponds to the node batch processing unit.

At 120, the method may include, on each node batch processing unit, for each frontier tree node in the respective tree node batch, aggregating the associated partial histograms for each split function to form an aggregated histogram for each split function at the frontier tree node. At 122, the method may further include determining a selected split function for each frontier tree node by computing the split function that produces maximum information gain.

At 124, the method may include reclassifying each of the frontier tree nodes as split nodes including each of the respective optimal split functions. At 126, the method may include expanding the decision tree to include new frontier tree nodes branching from the reclassified split nodes. At 128, the method may include determining whether a termination condition is met, for example by determining whether a specified depth of the decision tree has been reached, or whether a minimum threshold information gain has been reached at the frontier nodes. Once it is determined at 128 that the termination condition is met, the method includes, at 132, outputting the decision tree for installation on a downstream computing device.

In one embodiment, prior to aggregating at 120, the method further includes assigning each of the plurality of node batch processing units a respective subset of the frontier tree nodes. Further, the method may include, on each of the plurality of data batch processing units, selecting a subset of data from the respective data batch, the selected subset of data including each datum that is classified by the decision tree to be at a corresponding frontier tree node. The method may also include transmitting from the plurality of data batch processing units, the partial histogram for the selected subset of data to the node batch processing unit associated the corresponding frontier tree node, for the node batch processing units to aggregate the associated partial histograms for each split function to form an aggregated histogram.

According to another embodiment, the method may be configured to accommodate split function batching, and thus may further include, in a split function batch phase, partitioning split functions for the decision tree into a plurality of split function batches, distributing each split function batch to a respective split function batch processing unit, and distributing all data units in the training data to each of the plurality of split function batch processing units. The method may further include evaluating each split function of each batch on its respective split function batch processing unit for each datum in the training data, to thereby compute a histogram for each split function, and selecting a split function with a histogram that produces maximum information gain. The decision tree may be expanded to include a split node having the selected split function, as described above in relation to FIG. 7, for example.

In another embodiment, each data unit contains at least one image, each image includes at least one datum which is a pixel, and evaluating a split function in method 100 may include computing a pixel characteristic for the pixel. In this embodiment, each pixel may have pixel data including color, intensity, and depth, the depth being determined by a depth camera. The pixel characteristic may be computed, for example, based on the pixel data for a target pixel and other pixels in a vicinity of the pixel. The decision tree that is output by method 100 may be configured to classify the pixel into one of a plurality of classes, each class associated with one of the frontier tree nodes, the classes representing corresponding body locations on a body model. The output decision tree may be outputted, for example, to a game console for use in processing images in a real time data stream from a source such as a depth camera.

Further, it will be appreciated that other applications are also contemplated, such as medical imaging applications. Accordingly, the output may be sent to a medical imaging device, etc. as described above.

While the embodiments described above have been described mainly referring to training data including images, audio data may also be used to train the decision tree. In such an embodiment, each data unit contains audio data, and each audio data unit includes at least one datum that is a portion of an audio signal. Further, evaluating a split function in method 100 may include computing an audio characteristic for the portion of the audio signal.

There are several potential advantages of the above described systems and methods. For example, by organizing the training in the manner described above a fault-tolerant training system may be achieved. If a processing unit in the group fails during a training session, only a small piece of the overall computation has to be redone.

Further, it will be appreciated that the results of each data batch processing unit computation (such as the results of the computation illustrated in FIG. 5) may be saved to a mass storage device. By saving the results in this manner, an automatic "checkpointing" of the results is achieved, which facilitates recovery of data after hardware or software failures by restarting the computation from the most recently saved data.

Another potential advantage is that sparse representations of histograms may be used to reduce memory consumption. As decision tree training progresses, a given tree node will receive fewer training examples and therefore the computed histograms will have more zero values. Therefore, the systems and method described above may include representing these histograms from an array representation to a sparse representation, which will save memory, at the expense of computation time. The sparse representations of the histograms may be stored as hash tables, heaps, lists of (key, count), or other data structures. It will be appreciated that if two sparse histograms are both sorted by key, then merging them is a fast linear time operation, potentially saving processing time.

It will also be appreciated that, by varying the number of partitions of the data, for the breadth first and the split function distributed approach, the system may make trade offs between computation time and memory usage of the processing units. In addition, such trade offs between computation and memory usage trade offs may be made after computation of the breadth first algorithm described above, and before the many to many mapping of data batch processing units and node batch processing units, by streaming out and storing in mass storage several partial histograms. In this manner the number of node batch processing units may be reduced, or increased, as desired.

As described above each processor unit may be a multicore processor, and process different data units on different cores of the processor, in parallel. Parallel processing in this manner can reduce computation time.

It will also be appreciated that use of the above systems and methods enables reusing of the codebase for implementing the algorithms described above, to perform distributed testing. To achieve this, the test data is partitioned across the group of processing units, the trained decision tree is passed to various processing units in the group, and each processing unit computes test metrics on its partition of the training data. These metrics are then aggregated on a central or control processing unit, and the result is presented to the user.

The above described systems and methods may be utilized to efficiently training decision trees on large data sets, in a distributed manner using parallel processing algorithms that spread computing tasks across multiple processing units.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computerized decision tree training system, comprising:
   a distributed control processing unit configured to receive input of training data for training a decision tree, the training data including multiple data units, each data unit further including at least one example datum having an associated class label;
   a plurality of data batch processing units, each data batch processing unit being configured to receive a respective data batch representing a subset of the data units in the training data from the distributed control processing unit, and to evaluate each of a plurality of split functions of the decision tree for the respective data batch, to thereby compute a partial histogram for each split function and each datum in the data batch; and
   a plurality of node batch processing units, for each of a subset of frontier tree nodes of the decision tree in a respective tree node batch, each node batch processing unit being configured to receive and aggregate the associated partial histograms for each split function to form an aggregated histogram for each split function at each of the frontier tree nodes of the subset, wherein each of the node batch processing units is configured to determine a selected split function for each frontier tree node in the respective subset by computing the split function that produces highest information gain for the frontier tree node;
   wherein the distributed control processing unit is further configured to reclassify each of the frontier tree nodes as a split node including a respective one of the selected split functions, to expand the decision tree to include new frontier tree nodes branching from the split nodes, and to output the decision tree for installation on a downstream computing device.

2. The system of claim 1,
wherein the distributed control processing unit is configured to store in a mass storage device the received training data, to partition the training data into the plurality of data batches, and to distribute each data batch to a respective data batch processing unit, for computation of the partial histograms of the split functions for each data batch by each respective data batch processing unit.

3. The system of claim 1,
wherein the distributed control processing unit is configured to assign each of the plurality of node batch processing units a respective subset of the frontier tree nodes;
wherein, each of the plurality of data batch processing units is configured to select a subset of data from the respective data batch, the selected subset of data including each datum that is classified by the decision tree to be at a corresponding frontier tree node; and
wherein each of the plurality of data batch processing units is configured to transmit the partial histogram for the selected subset of data to the node batch processing unit associated the corresponding frontier tree node, for the node batch processing units to aggregate the associated partial histograms for each split function to form the aggregated histogram.

4. The system of claim 1,
wherein the aggregated histogram for each split function at the frontier tree node batch is computed on the respective node batch processing unit.

5. The system of claim 1,
wherein each data unit contains at least one image or image region, each image or image region includes at least one datum which is a pixel, and wherein evaluating a split function includes computing a pixel characteristic for the pixel;
wherein each pixel has pixel data including color, intensity, and depth, the depth being determined by a depth camera;
wherein the pixel characteristic is computed based on the pixel data for a target pixel and other pixels in a vicinity of the pixel.

6. The system of claim 5,
wherein training data includes images of bodies, and at least some of the pixels in the training data have been classified as being associated with respective classes in a body model, the classes representing corresponding body locations; and
wherein the output decision tree is configured to classify the pixels of a target image into one of a plurality of classes, each class associated with one of the frontier tree nodes, at least some of the classes representing corresponding body locations on the body model.

7. The system of claim 5,
wherein the output decision tree is outputted to a game console for use in processing images in a real time data stream.

8. A computerized decision tree training method, comprising:
   receiving input of training data for training a decision tree, the training data including multiple data units, each data unit further including at least one example datum having an associated class label;

for each datum in each data unit in each of a plurality of data batches of the data units, evaluating each of a plurality of split functions of the decision tree on a respective data batch processing unit for each data batch, to thereby compute a partial histogram for each split function and each datum in the data batch;

for each of a subset of frontier tree nodes of the decision tree in a respective tree node batch, receiving and aggregating the associated partial histograms for each split function to form an aggregated histogram for each split function at the frontier tree node, at a respective node batch processing unit;

determining a selected split function for each frontier tree node by computing the split function that produces highest information gain;

reclassifying each of the frontier tree nodes as a split node including a respective one of the selected split functions;

expanding the decision tree to include new frontier tree nodes branching from the split nodes; and outputting the decision tree for installation on a downstream computing device.

9. The method of claim 8, wherein prior to evaluating the split functions, the method further comprises:
partitioning the training data into the plurality of data batches; and
distributing each data batch to the respective data batch processing unit, for computation of the partial histograms for each of the plurality of split functions by each data batch processing unit.

10. The method of claim 8, wherein prior to aggregating, the method further comprises:
assigning each of the plurality of node batch processing units a respective subset of the frontier tree nodes;
on each of the plurality of data batch processing units, selecting a subset of data from the respective data batch, the selected subset of data including each datum that is classified by the decision tree to be at a corresponding frontier tree node; and
transmitting from the plurality of data batch processing units, the partial histogram for the selected subset of data to the node batch processing unit associated with the corresponding frontier tree node, for the node batch processing units to aggregate the associated partial histograms for each split function to form an aggregated histogram.

11. The method of claim 8, wherein the aggregated histogram for each split function at the frontier tree node batch is processed on the respective node batch processing unit.

12. The method of claim 8, wherein the decision tree is expanded according to a hybrid breadth first/depth first algorithm, including a breadth first training phase and a depth first training phase.

13. The method of claim 8, further comprising:
in a split function batch phase, partitioning split functions for the decision tree into a plurality of split function batches;
distributing each split function batch to a respective split function batch processing unit;
distributing all data units in the training data to each of the plurality of split function batch processing units;
evaluating each split function of each batch on its respective split function batch processing unit for each datum in the training data, to thereby compute a histogram for each split function; and
selecting a split function with a histogram that produces maximum information gain.

14. The method of claim 8, wherein the decision tree is expanded in according to a hybrid breadth first/split function algorithm, including a breadth first phase and a split function phase.

15. The method of claim 8, wherein each data unit contains at least one image or image region, each image or image region includes at least one datum which is a pixel, and wherein evaluating a split function includes computing a pixel characteristic for the pixel.

16. The method of claim 15, wherein each pixel has pixel data including one or more of color, intensity, and depth, the depth being determined by a depth camera.

17. The method of claim 15, wherein the pixel characteristic is computed based on the pixel data for a target pixel and other pixels in a vicinity of the pixel.

18. The method of claim 15, wherein the output decision tree is configured to classify the pixel into one of a plurality of classes, each class associated with one of the frontier tree nodes, the classes representing corresponding body locations on a body model.

19. The method of claim 18, wherein an output decision tree is outputted to a game console for use in processing images in a real time data stream.

20. A computerized decision tree training method, comprising:
receiving input of training data, the training data including multiple data units, each data unit including at least one image or image region, each data unit further including at least one example datum having an associated class label;
initializing a decision tree, the decision tree being having a plurality of associated split functions and classes, and being comprised of a root node and one or more split nodes and frontier tree nodes;
partitioning the training data into a plurality of data batches, each data batch including a respective subset of data units;
distributing each data batch to a respective data batch processing unit;
for each datum in each data unit in each data batch, evaluating each of the split functions on the respective data batch processing unit for the data batch, to thereby compute a partial histogram for each split function and each datum in the data batch;
partitioning the frontier tree nodes into a plurality of frontier tree node batches;
distributing each frontier tree node batch to a respective node batch processing unit;
distributing the partial histograms for a selected subset of data from each data unit in each data batch on each of the respective data batch processing units to a corresponding node batch processing unit, wherein the selected subset is selected by selecting each datum that is classified by the decision tree to be at a frontier tree node that corresponds to the node batch processing unit;
on each node batch processing unit, for each frontier tree node in the respective tree node batch, aggregate the associated partial histograms for each split function to form an aggregated histogram for each split function at the frontier tree node;
determining a selected split function for each frontier tree node by computing the split function that produces maximum information gain;
reclassifying each of the frontier tree nodes as split nodes including each of the respective optimal split functions;
expanding the decision tree to include new frontier tree nodes branching from the split nodes; and
outputting the decision tree for installation on a downstream computing device.

* * * * *